United States Patent [19]
Maechtle

[11] Patent Number: 5,282,697
[45] Date of Patent: Feb. 1, 1994

[54] COMPOUND ANCHOR

[75] Inventor: Daniel Maechtle, Korntal, Fed. Rep. of Germany

[73] Assignee: Maechtle GmbH, Dieselstrasse, Fed. Rep. of Germany

[21] Appl. No.: 838,882

[22] Filed: Feb. 21, 1992

[30] Foreign Application Priority Data

Feb. 28, 1991 [DE] Fed. Rep. of Germany ....... 4106311

[51] Int. Cl.⁵ .................. E21D 20/02; E21D 20/00
[52] U.S. Cl. ................... 405/259.6; 52/704; 206/219; 405/259.5
[58] Field of Search .............. 405/259.5, 259.6, 244; 52/704, 698; 206/219

[56] References Cited

U.S. PATENT DOCUMENTS

| | | | |
|---|---|---|---|
| 3,108,443 | 10/1963 | Schuermann et al. | 405/259.6 |
| 3,702,060 | 11/1972 | Cumming | 405/259.6 |
| 4,729,696 | 3/1988 | Goto et al. | 405/259.6 |

FOREIGN PATENT DOCUMENTS

| | | | |
|---|---|---|---|
| 224588 | 11/1962 | Austria | 405/259.6 |
| 3316855 | 11/1984 | Fed. Rep. of Germany . | |
| 3806598 | 9/1989 | Fed. Rep. of Germany . | |
| 403267499 | 11/1991 | Japan | 405/259.6 |
| 1506131 | 9/1989 | U.S.S.R. | 405/259.6 |
| 953056 | 3/1964 | United Kingdom . | |
| 1293619 | 10/1972 | United Kingdom | 405/259.6 |
| 1293620 | 10/1972 | United Kingdom | 405/259.6 |
| 1323112 | 7/1973 | United Kingdom . | |
| 2028451 | 3/1980 | United Kingdom . | |
| 2078897 | 1/1982 | United Kingdom . | |

*Primary Examiner*—Dennis L. Taylor
*Attorney, Agent, or Firm*—Shlesinger Arkwright & Garvey

[57] ABSTRACT

A compound anchor to affix an anchor shank in a borehole, comprising a glass cartridge (12) which can be inserted into the borehole and which receives both cement or a dry mortar and an inside container encasing water. A sealing cap (14) is present at the borehole entry and can be pierced by the anchor shank (15) and will seal the borehole at least until the binder hardens. The inside container (22) consists of container parts (26) distributed over the length of the cartridge (12) and individually destroyed as the anchor shank (15) advances into the borehole, whereby the dry mortar shall be evenly soaked with the liquid component in all depth zones of the cartridge and shall be mixed with the cartridge and inside-container splinters (FIG. 1).

12 Claims, 2 Drawing Sheets

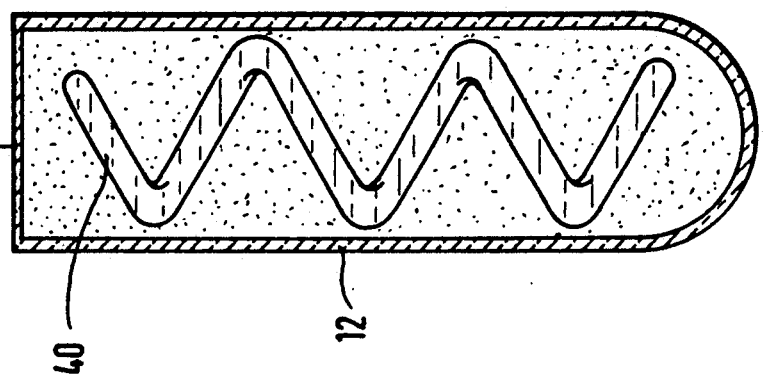
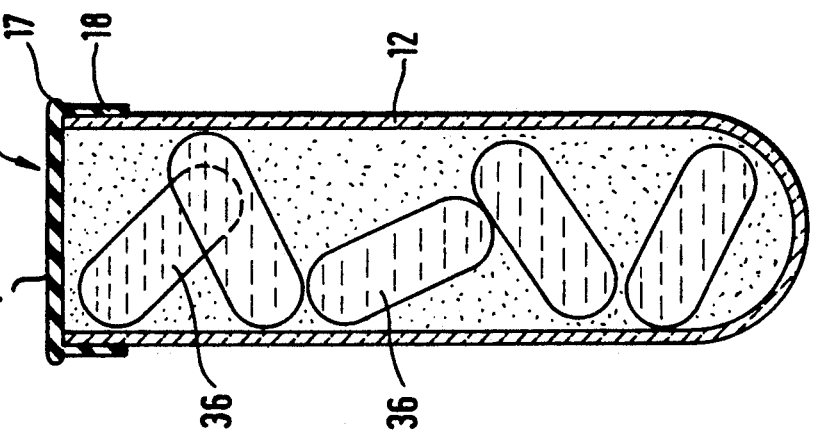
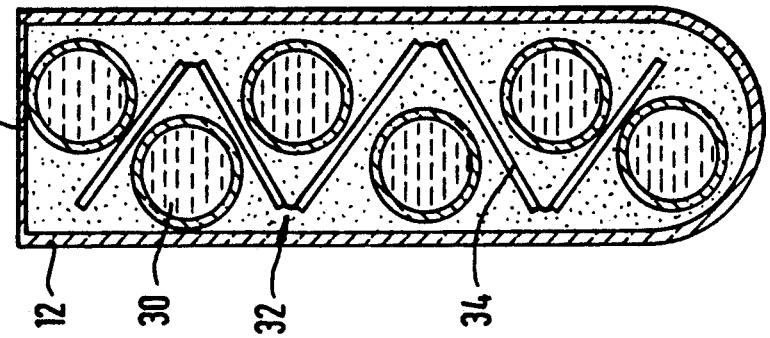

COMPOUND ANCHOR

FIELD OF THE INVENTION

The invention concerns a compound anchor to affix an anchor shank in a borehole.

BACKGROUND OF THE INVENTION

A compound anchor of the above kind is known from the British patent 953,056 and comprises a glass cartridge filled with cement, plaster, lime or another dry mortar and also a brittle inside container encasing water and any rapid-curing means dissolved in it. The rear aperture of the cartridge is hermetically sealed by a cover. A plastic stopper with a central orifice is mounted on the cover and rests externally against the borehole wall. This known compound anchor is laborious or disadvantageous in that, to close the cartridge using a hermetic cover, several time-consuming operations are required. Substantial forces being exerted by the rotationally driven anchor shank, there is danger that the foam adhering to the rupturing cover parts shall tear and that as a result the thin cement mixture no longer shall be adequately sealed. Even when the borehole is horizontal, it must be expected that water shall drain from the inside container through its first-destroyed end, i.e., there shall be excess water at the entry of the borehole, the powder cement mortar remaining dry from the middle to the bottom of this borehole. The problem of incomplete mixing of the binder is more acute yet with any up-slanting, and most of all with vertical, upward boreholes. There is strong expectation in all these cases that the anchor shank shall fail to be firmly bound into the borehole in the light of the thin cement slurry caused by excess water and draining from the borehole on account of a tearing plastic stopper when the seal is destroyed.

OBJECTS AND SUMMARY OF THE INVENTION

The object of the invention is to so improve a compound anchor of the above type that irrespective of the direction of the borehole, the powder component shall be uniformly mixed with water over the entire depth of the borehole so that there shall be optimal anchoring of the anchor shank.

This problem is solved by the present invention. In this solution, the anchor shank entering the cartridge advantageously destroys the inside container only stepwise and the liquid component is released only in partial amounts sufficient to adequately soak the surrounding powder component and to make a paste of them. The water release apportioned during the advance of the anchor shank takes place regardless of the segments of the inside container being mutually sealed or communicating.

Instead of the conventional plastic and hardeners, the invention makes use of inorganic substances, for instance rapidly curing mixtures of cement and water, which are ecologically unobjectionable and meet all requirements of fireproofing. The invention therefore solves the problem of the low viscosity of water, namely that the thin cement slurry drains out of the borehole at the beginning of the destruction of the borehole before mixing has been fully completed. The liquid component being released only in partial amounts, the adjacent zones can be intensively mixed with the amounts of cement and filler present therein, including the produced glass splinters, over the entire borehole depth.

The inside container may comprise a linear sequence of bulges and constrictions and may roughly extend over the length of the cartridge. These spherical, elongated or flattened bulges assure that all zones of the dry component shall uniformly be supplied with the amounts of liquid required for mixing, and this over the depth of the cartridge, and that there shall be no local excess of liquid. The uniform distribution of liquid is further improved if the inside container always shall be sealed across the constrictions between the bulges. Consequently, when installing over-head, there shall be liquid available in reliable manner even at the end of the cartridge, that is even at the highest point of the borehole, to mix the binder.

In order to keep the inside container centered when the powder component is inserted into it and also during storage and shipping, spider-like positioning means, herein called merely "spiders", made of thin radial arms may be used, which start from an open ring slipped on a constriction, or of a similar means, and which may extend as far as the cartridge wall. The thin radial arms or fins may consist of a brittle or of an elastic material and may enhance mixing when the anchor shank is advancing.

In one variation, the liquid component may be encased in a plurality of globes of which the diameter for instance shall be equal to or less than the cartridge radius. Instead of globes, the container also may consist of a plurality of ampules of which the length is less than, or not much larger than the cartridge diameter and which are uniformly distributed in the cartridge. Again polygonal hollow bodies may be used. Where the inside container is a helical glass tube, the inside diameter of the helix shall be less than the anchor shank diameter to ensure susceptibility to destruction. The glass tube may comprise several constrictions between which the liquid component forms apportioned volumes.

In order to maintain uniform distribution in the inside container while in shipping and in use, suitable positioning means may be resorted to. Their cross-sections are small so that they shall not degrade the inner bond produced by the binder. Spiders without central parts may form spacers in order to keep globes or other partial containers distributed in the cartridge. Illustratively another spacer is a sequence of flexible or bending frames with thin braces laid out in zig-zag manner in the cartridge.

In another important feature of the invention, a sealing cap made of rubber or of a plastic with restricted elasticity serves to seal the borehole entry, said cap comprising a lid which can be pierced by the anchor shank and a radial rim enclosing the cartridge and forming a seal resting against the borehole wall.

The sealing cap may comprise pre-impressed radial lines that, upon penetration of the anchor shank, shall form sealing laminations at the periphery of that shank. In a variation, the sealing cap comprises a central orifice with a rim in the form of a flange or a collar so as to form a seal by resting against the anchor shank. If the sealing-cap rim encloses the cartridge and rests in sealing manner against it, the material filling the cartridge does not mandatorily require being fused shut or being sealed. Instead the sealing cap may assume the role of the cartridge closure during storage and shipping and later in use it may additionally serve to seal the borehole. Until the compound anchor is installed, the orifice of the sealing cap can be made externally tight by a stick-on paper or the like.

In order to act as a stop to limit the insertion of the sealing cap in the borehole, the lid may evince a diameter which is larger than that of the axial rim of said cap.

BRIEF DESCRIPTIONS OF THE DRAWINGS

Illustrative embodiments of the compound anchor of the invention are elucidated below in relation to the drawing, in which each figure is schematic.

FIGS. 2 through 4 are longitudinal sections of the cartridge with different inside containers.

DETAILED DESCRIPTION OF THE INVENTION

Figure 1:
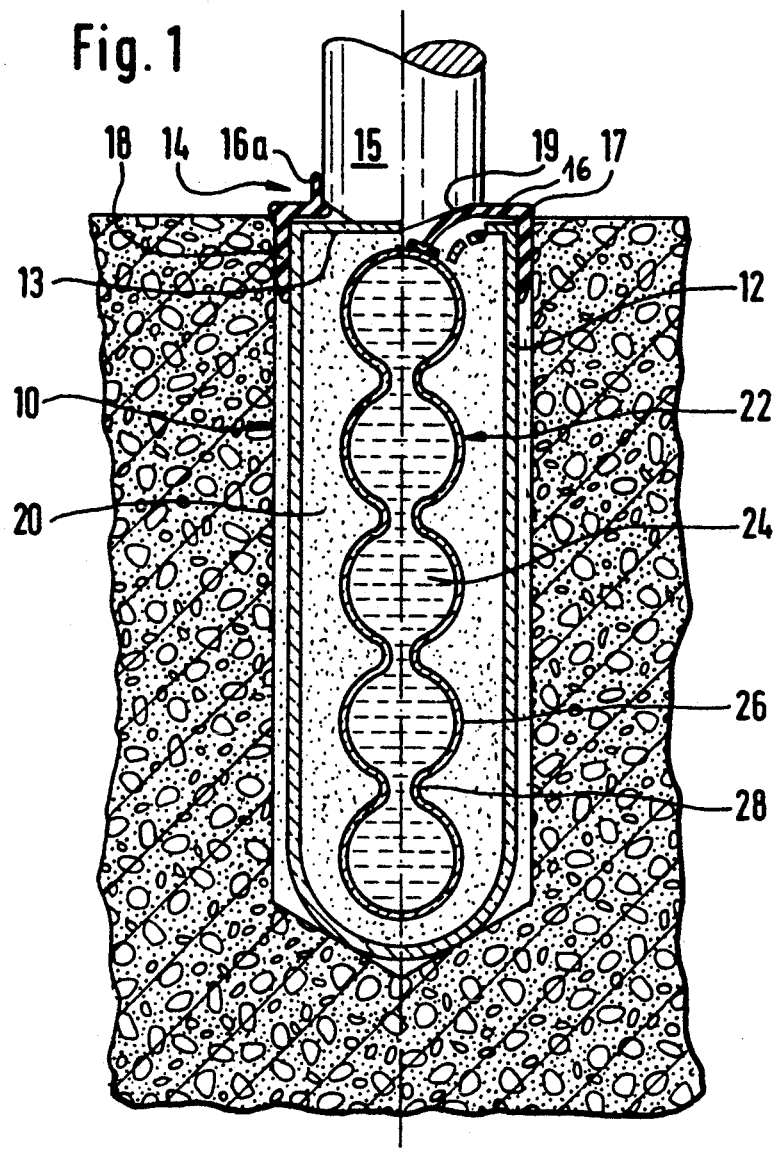
FIG. 1 is an axial, longitudinal section of a borehole together with a compound shank before the anchor shank shall be rotated inward.

FIG. 1 shows a borehole 10 of suitable depth and diameter and receiving a compound-anchor cartridge 12 resembling a short test tube. This cartridge contains cement serving as the powder component 20, where called for in mixture with a granular filler, and further it holds an inside container 22 preferably extending over the entire length of the cartridge, which encases water 24 serving as the liquid component.

Figure 5:
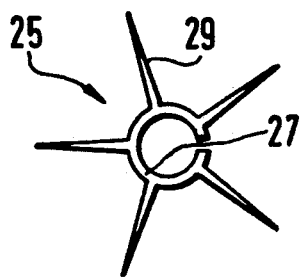
FIGS. 5, 6 are elevations of a spider and a frame resp. used as positioning means for the inside container.

The inside container 22 is made of glass or of another brittle material and as shown in FIG. 1 evinces a sequence of bulges 26 and constrictions 28. In order to keep centered the inside container 22 when the powder component 20 is filled into the cartridge 12, a spider spacer 25 such as illustrated by FIG. 5 can be mounted in the zone of one or several constrictions 28, said spider evincing an open central part 27 and thin arms 29 resting against the cartridge inside wall.

The cartridge is sealed after having been filled with both components. In case filling is automated, the open cartridge end may be fused shut or else it may be closed by a hermetic backwall 13. On the other hand the open cartridge will be sealed by a sealing cap 14 shown in FIG. 1 or FIG. 3. This sealing cap 14 can be pierced by the anchor shank and consists of a dimensionally stable rubber or of an elastic plastic, and it comprises a radial lid 16 and furthermore an axially adjoining rim or collar 18. The sealing cap rim 18 may be prestressed radially inward in order to rest snugly against the cartridge. The outside of the rim 18 may comprise for instance a roughened bead or other boss in order to seal the space between the cartridge periphery and the wall of the borehole 10. Preferably the periphery of the lid 16 of the sealing cap 14 is wider than the rim 18, so that the outer flange 17 so produced rests in the form of a stop against the borehole entry to limit the depth of insertion of the sealing cap and in order to always ensure sealing at the borehole entry.

Starting at its middle, the sealing cap 14 comprises pre-embossed radial cutting lines whereby, when the anchor shank 15 in FIG. 1 is forced inward, an orifice is formed, and also, as shown on the right of the center line, tongues or lamellas 19 sealing said orifice. A variation of the sealing cap 14 with a central orifice is shown left of the center line of FIG. 1, the rim of said central orifice forming a flange 16a or a collar to seal the anchor shank.

The constrictions 28 of the inside container 22 of FIG. 1 ensure that the anchor shank inside the cartridge shall rupture, sequentially in time the partial containers filled with liquid and that the liquid shall be prevented from rapidly draining toward the bulges 26 that were ruptured first. Therefore, while the anchor shank is rotated inward, there are individually apportioned amounts of liquid available in all depth zones of the cartridge to ensure uniform mixing both of the two components, the fillers and of the ruptured cartridge 12 and the inside container. The anchor shank 15 may be provided at the front end with a blunt operative edge which when being advanced will destroy the glass of the inside container and the cartridge and thereby shall make the glass splinters a component of the bonding material.

Figure 6:
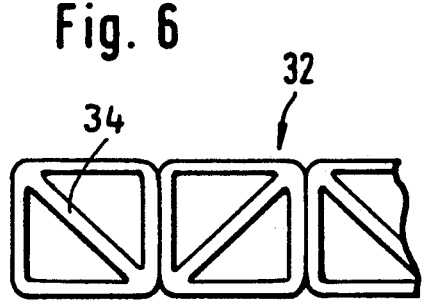

As shown by FIG. 2, the inside container consists of a plurality of glass globes 30, or globes made of another brittle material, which are kept in place by suitable positioning means 32, for instance frames as shown in FIG. 6, within the cartridge 12 so as to be evenly distributed. The zig-zagging and mutually flexible or snap-off frames comprises thin plastic braces 34 or crossbars that do not interfere with mixing and that may brittly snap apart.

As shown by FIG. 3, the second component is contained in elongated sealed ampules 36. Appropriately the ampule length is less, or not much more than the inside cartridge diameter, so that when the cartridge is being filled with the powder mixture, uniform distribution of the ampules 36 and also the retention of this distribution shall be simplified.

In FIG. 4, the inside container holding the liquid component consists of an approximately helical glass tube 40 with a capacity matching the cartridge cement mixture. The inside diameter of the tube—which is made of glass or of another brittle material—is less than the diameter of the anchor shank 15. In order that the amounts of liquid be apportioned as above to the surrounding powder mixture, the glass tube may evince several (omitted) constrictions along its extension.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. A compound anchor for securing an anchor shank in a borehole, comprising:
   a) an outer cartridge closed at its front end and adapted to be received in a borehole;
   b) said cartridge being made of a brittle material and filled with a powder component of an inorganic, hardenable binder;
   c) a brittle inner container disposed inside said cartridge and filled with water to form a liquid component of the hardenable binder;
   d) a covering element for closing said cartridge at its rear end;
   e) said cartridge and said inner container are adapted to be destroyed and turned into splinters when the anchor shank is forced through said covering element, thereby releasing the components into the borehole and mixing the splinters therewith;

f) said covering element being an elastic sealing cap having a lid adapted to be pierced by the anchor shank and thereby provide a seal around the anchor shank;

g) said sealing cap having an axially disposed outer rim adapted to form a seal between the borehole wall and the outside of said cartridge; and h) said inner container including portions delimited against each other and distributed over the length of said cartridge such that said portions are sequentially destroyed when the anchor shank is being forced in, thereby gradually releasing the included water to the powder component surrounding said inner container portions so that the powder component is uniformly mixed with water in all depth of the borehole.

2. A compound anchor as in claim 1, wherein:
a) said inner container is a substantially linear alternating sequence of bulges and constrictions extending approximately over the length of said cartridge.

3. A compound anchor as in claim 2, wherein:
a) said bulges are closed at their respective constrictions.

4. A compound anchor as in claim 1, and further comprising:
a) spider-like positioning means having thin radial arms extending from a central part thereof adapted to be slipped around said inner container and extending as far approximately as the cartridge wall, thereby to center said inner container within said cartridge.

5. A compound anchor as in claim 1, wherein:
a) said inner container comprises a plurality of closed globes disposed uniformly within said cartridge.

6. A compound anchor as in claim 5, and further comprising:
a) spacers made of a brittle material disposed within said cartridge such that said globes are uniformly distributed over the length of said cartridge.

7. A compound anchor as in claim 1, wherein:
a) said inner container comprises a plurality of elongated ampules distributed within said cartridge.

8. A compound anchor as in claim 7, and further comprising:
a) spacers made of a brittle material disposed within said cartridge such that said ampules are uniformly distributed over the length of said cartridge.

9. A compound anchor as in claim 1, wherein:
a) said inner container is a glass tube having an overall shape of a helix with an inside diameter being less than the anchor shank diameter, said glass tube having a plurality of constrictions along its course.

10. A compound anchor as in claim 1, wherein:
a) said sealing cap comprises pre-embossed radial cutting lines adapted to produce lamellas upon penetration of said sealing cap by the anchor shank, said lamellas adapted to rest in sealing manner against the periphery of the anchor shank.

11. A compound anchor as in claim 1, wherein:
a) said sealing cap includes a central orifice having a collar disposed around the rim of said orifice such that said collar is disposed in sealing manner against the periphery of the anchor shank when the anchor shank is forced through said orifice.

12. A compound anchor as in claim 1, wherein:
a) said sealing cap includes a peripheral circumferential radial flange thereby to provide a stop for limiting the penetration depth of said sealing cap in the borehole.

* * * * *